Figure 1:
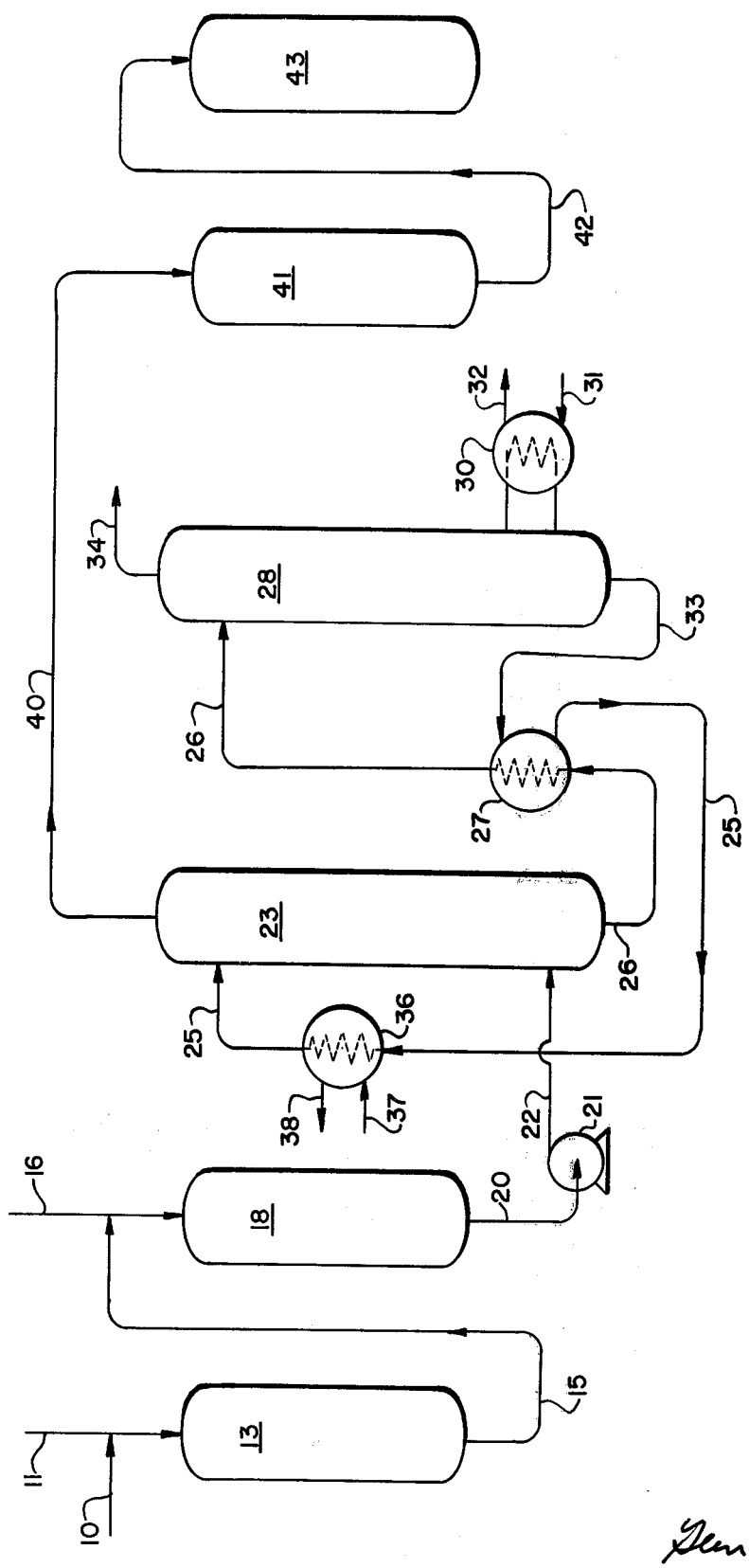

United States Patent [19]
Miller et al.

[11] 3,965,253
[45] June 22, 1976

[54] PROCESS FOR PRODUCING HYDROGEN

[75] Inventors: Donald W. Miller, Old Greenwich, Conn.; Keith E. Zarker, Orinda, Calif.

[73] Assignee: Shell Oil Company, Houston, Tex.

[22] Filed: May 7, 1975

[21] Appl. No.: 575,297

Related U.S. Application Data

[60] Continuation of Ser. No. 248,965, May 1, 1972, abandoned, which is a division of Ser. No. 746,848, July 23, 1968, abandoned.

[52] U.S. Cl. .............................. 423/652; 423/437; 423/650; 423/651; 423/655
[51] Int. Cl.² ...................... C01B 1/16; C01B 1/18; C01B 1/32; C01B 31/20
[58] Field of Search ........... 423/652, 655, 644, 650, 423/651, 437; 208/108

[56] References Cited
UNITED STATES PATENTS

| | | |
|---|---|---|
| 1,706,707 | 3/1929 | Reilly et al. ............................ 55/68 |
| 2,747,970 | 5/1956 | Rosenblatt ........................ 423/648 |
| 3,054,660 | 9/1962 | Crooks et al. ...................... 423/359 |
| 3,213,012 | 10/1965 | Kline et al. ......................... 208/110 |
| 3,297,408 | 1/1967 | Marshall, Jr. ....................... 423/652 |
| 3,347,621 | 10/1967 | Papadopoulos et al. ............. 423/226 |
| 3,352,631 | 11/1967 | Zarker ................................ 423/229 |
| 3,401,111 | 9/1968 | Jackson ............................ 208/108 |
| 3,420,633 | 1/1969 | Lee ..................................... 423/229 |
| 3,463,603 | 8/1969 | Freitas ............................... 423/228 |
| 3,567,381 | 3/1971 | Beavon et al. ...................... 423/650 |
| 3,803,025 | 4/1974 | Dailey ............................. 423/648 X |

Primary Examiner—Edward Stern

[57] ABSTRACT

A process for supplying hydrogen to a hydrogen-consuming process including catalytically partially oxidizing hydrocarbon to produce a carbon monoxide- and hydrogen-containing gas, catalytically reacting water with the carbon monoxide- and hydrogen-containing gas to produce a carbon dioxide- and hydrogen-containing gas, centrifugally compressing the carbon dioxide- and hydrogen-containing gas to at least 180 psia carbon dioxide partial pressure and contacting it with an absorbing liquid containing diisopropanolamine and a cyclotetramethylene sulfone, catalytically reacting the absorber effluent gas at conditions to react hydrogen with carbon oxides to produce methane and passing the resultant hydrogen-containing gas to the hydrogen-consuming process.

5 Claims, 2 Drawing Figures

PROCESS FOR PRODUCING HYDROGEN

This is a continuation of application Ser. No. 248,965, filed May 1, 1972, which in turn is a division of application Ser. No. 746,848, filed July 23, 1968, now both abandoned.

BACKGROUND OF THE INVENTION

For many processes, particularly in the petroleum processing industry, it is necessary to provide hydrogen as a portion of the charge. These hydrogen-consuming processes are usually high pressure processes such as hydrogenation or hydrocracking and they are usually effected in the presence of a catalyst. Ordinary operation of a refinery does not produce sufficient hydrogen to supply these processes; and as a result, an outside source of hydrogen must be provided. Additionally, catalytically effected processes are usually quite sensitive to catalyst poisons; and it is necessary that the hydrogen produced be quite free from even small quantities of impurities that may affect the activity of the catalyst.

Hydrogen may be formed in a process where hydrocarbons are partially oxidized with oxygen or water to produce carbon monoxide and hydrogen. One typical process of this nature is known as the steam-hydrocarbon reforming process. It is effected by oxidizing light hydrocarbons and reducing water in the presence of a catalyst to produce high yields of hydrogen and carbon monoxide. The process is favored by high temperatures and it is usually performed at temperatures in the neighborhood of 1400°–1500°F and at pressures of about 200 psig. Higher pressures have such an adverse effect on the equilibrium of the reaction that they must be avoided.

The high yield of hydrogen can be increased if the gas from the partial oxidation reaction is subjected to a process that is known as the carbon monoxide shift conversion reaction. The gases from the partial oxidation process are mixed with water and passed into contact with a catalyst that promotes the oxidation of carbon monoxide and reduction of water to produce hydrogen and carbon dioxide. This reaction is benefited by lower temperatures, and it is usually effected at temperatures in the neighborhood of 450°F. The reaction is frequently performed in two stages, the first stage at higher temperatures with a less active catalyst and the final stage at about 450°F with a more active catalyst.

To produce hydrogen of sufficient purity for a catalytic hydrogen-consuming process, it is necessary to remove the large volume of carbon dioxide in the effluent from the carbon monoxide shift conversion reaction. Carbon dioxide is an acidic gas, and it can be removed to low levels by being absorbed in a suitable solvent, preferably a basic solvent that has both chemical and physical activity. A particularly useful solvent of this type disclosed in U.S. Pat. No. 3,347,621 issued to Papadopoulos is one containing diisopropanolamine, a cyclotetramethylene sulfone and water. Other absorbents that are used include aqueous monoethanol amine and hot potassium carbonate solutions.

The gas recovered from such an absorption process is very low in carbon oxides and very rich in hydrogen, but even this gas contains too much carbon monoxide for use in modern catalytic hydrogen-consuming processes since catalysts employed in such hydrogen-consuming processes are generally sensitive to carbon monoxide poisoning.

Accordingly, the absorber effluent gas may be subjected to a methanation reaction wherein the absorber effluent is contacted with a catalyst at conditions suitable for reacting carbon oxides with hydrogen to produce methane and water, both of which are relatively inert impurities with respect to the catalysts usually employed in hydrogen-consuming processes. The gas from the methanation reaction zone is suitable for use in high pressure catalytic hydrogen-consuming processes, and it is generally compressed to the high pressure that is typical of hydrogen-consuming processes and introduced into the hydrogen-consuming process as a portion of the charge. All of the foregoing reactions, and this particular combination of these reactions, are known to the prior art.

THE INVENTION

In accordance with this invention, the above-described process is modified by compressing the effluent from the carbon monoxide shift conversion reaction to sufficient pressure to provide a carbon dioxide partial pressure of at least 180 psia before the gas is passed into contact with the absorbing liquid. This modification of the process has been found to produce several unexpected and advantageous benefits.

In accordance with the prior art the large volume of carbon dioxide is removed from the gas stream before it is compressed, thereby avoiding the necessity of compressing that volume of gas at all. Good engineering indicates that, when there is a choice between compressing a high volume gas stream, i.e., one containing a large volume of carbon dioxide plus hydrogen, or compressing a low volume gas stream, i.e., one containing only the hydrogen, it is more economical to compress the gas stream of lesser volume. However, an unexpected benefit was found in compressing the more voluminous carbon dioxide-containing gas in that it can be compressed centrifugally and with few stages, with an overall economic benefit compared to compressing the less voluminous purified gas which contains only low density hydrogen but which can be most economically done with a reciprocating, positive displacement compressor. However, a reciprocating compressor is more expensive considering such factors as purchasing, installing, operating, and maintaining, even though it involves compressing a less voluminous stream. In fact, the reciprocating compressors employed in such processes are usually the limiting factor in days that a hydrogen plant can be operated without a maintenance shut-down.

In addition to the advantage of a more economically operated compressor, it has been found that the absorption of carbon dioxide is benefited more than additively by operating the absorber at high pressure. In absorbing an acid gas in a liquid solvent it is expected that each increment of added pressure will produce a corresponding increment of gas solubility in the liquid solvent. However, each increment of added pressure also produces an increment of increased processing costs due to the difficulty of operating high pressure equipment and the initial higher cost of such equipment. Ordinarily, the curve of solvent efficiency versus pressure is fairly linear; but is has been found, particularly with the preferred solvent of this invention, that an unexpected inflection point in that curve occurs at about 180 psia carbon dioxide partial pressure, and for pressures in excess of this, each increment of added pressure produces a greater increment of solvent capacity than at lower pressures. As a result, a savings can be effected by absorbing at feed gas pressures in excess of 180 psi carbon dioxide partial pressure which is manifested either in production of a cleaner absorber effluent gas for a given number of absorption stages, or in the use of fewer stages to produce an absorber gas of a given purity. This advantage is completely additive to the savings effected by centrifugally compressing the more dense carbon dioxide-containing gas from the carbon monoxide shift conversion reaction zone.

A further advantage to high pressure absorption is that the greater solvent capacity results in a lesser flow of solvent so that pumps and solvent handling equipment can be smaller and less expensive to buy and operate.

In addition, the heat of solution of carbon dioxide in the smaller solvent volume causes the solvent to leave the absorber at a temperature closer to the temperature of the solvent stripper where the absorbed carbon dioxide is driven out of the solvent, and this high temperature fat solvent stream creates savings in several respects. First, the stripper reboiler supplies heat to a lesser volume of solvent that enters the stripper at a higher temperature, thereby greatly reducing the energy requirements of the stripper reboiler and significantly reducing the heat transfer surface requirements. When the stripper reboiler is supplied with heat from a source other than a hot process stream, this energy saving is substantial. Additionally, the heat exchange surface between the fat solvent stream from the absorber and the lean solvent stream from the stripper can be reduced significantly because the exchange is between lesser volumes of liquid. Savings in heat exchange surface create large capital and operating savings because heat exchangers represent more than half of the cost of a plant for absorbing acid gases from hydrogen-containing gas streams.

The absorber reboiler is usually operated by heat exchange with the feed gas to the absorber, that is the effluent stream from the carbon monoxide shift conversion reactor, or with other process streams that must be cooled. When this heat exchange arrangement is used, an outside source of cooling is required, rather than an outside source of heat. The outside energy requirements involve removing heat from the lean solvent stream after it is heat exchanged with the fat solvent, and, perhaps, further cooling the absorber feed gas. However, even this arrangement involves savings in the process of this invention because the high pressure absorption can function at higher lean solvent temperature. Therefore, even when the outside energy requirements of the system involve removing heat, the process of this invention effects large savings because less heat must be removed, and it is removed from a small-volume liquid stream.

Another small advantage of the process of this invention is that the methanation reaction effected on the effluent gas from the absorber is also benefited by high pressure in that the carbon oxide-methane equilibrium is shifted in favor of methane production by higher pressures.

It is preferred that the absorber operate at a pressure close to the pressure of the hydrogen-consuming process. The absorber can function at a slightly lower pressure than the hydrogen-consuming process so that a relatively inexpensive one-stage centrifugal compression of the hydrogen-containing gas is all that is necessary to raise it to the pressure of the hydrogen-consuming process. It is also within the scope of the invention to operate the absorber at a higher pressure than the hydrogen-consuming process when sufficient benefit in solvent efficiency is gained, but it is preferred that the absorption process and the hydrogen-consuming process operate at the same pressure to avoid the necessity for further compression of the gas after it leaves the absorber.

The present invention can be better described with reference to the accompanying drawings which illustrate, in FIG. 1, a schematic flow diagram of a process embodying this invention, and in FIG. 2, a plot of solvent capacity against carbon dioxide partial pressure which illustrates the advantage of absorption at elevated pressures.

Referring to FIG. 1, the process of supplying hydrogen to a hydrogen-consuming process is initiated by introducing methane through line 10 and water through line 11 into methane reforming zone 13 wherein reactions to form carbon monoxide and hydrogen occur at a temperature in the neighborhood of 1400°F and at a pressure in the neighborhood of 200 psi in the presence of a catalyst. As an alternative process, hydrogen may be formed by partial oxidation of heavy hydrocarbons with oxygen to produce carbon monoxide and hydrogen.

The effluent from reactor 13 passes through line 15 and is mixed with a stream of water passing through line 16 and passed into reactor 18. In reactor 18 conditions are maintained at about 450°F and 200 psi which are favorable for the reaction of carbon monoxide and water to produce hydrogen and carbon dioxide. This reaction is preferably effected in the presence of a catalyst and it results in an effluent stream passing through line 20 which contains substantial quantities of hydrogen and carbon dioxide, and small amounts of carbon monoxide and unreacted methane and water.

The gas stream passing through line 20 is compressed centrifugally in compressor 21 to a pressure at which the partial pressure of carbon dioxide is at least 180 psi and the stream is introduced through line 22 into the lower portion of absorption column 23.

In absorption column 23 the rising gas stream introduced through line 22 passes in countercurrent contact with a descending liquid stream of absorbent liquid introduced through line 25. The absorbent preferably is a liquid having both chemical and physical capacity, that is, one that is capable of dissolving an acid gas and one that is also capable of reacting with the acid gas to form a relatively unstable heat-decomposable compound. A particularly good liquid absorbent contains water, diisopropanolamine, and a cyclotetramethylene sulfone. As a result of the countercurrent contact in a suitable column, a gas substantially free of carbon dioxide passes from line 40 and a fat solvent stream passes through line 26, through heat exchanger 27 and into the upper portion of stripping column 28.

In stripping column 28 the solvent is thermally stripped of carbon dioxide by use of a reboiler 30 which is supplied with a heat source through lines 31 and 32. The reboiler heat source advantageously is the gas stream in line 20, which must be cooled before entering the absorber and is at a temperature of about 450°F, but it may be any other hot process stream that must be cooled, or an outside source of energy such as high pressure steam. As a result of the stripping process, a lean solvent stream passes from the lower portion of stripper 28 through line 33 and stripped gases are removed from the upper portion of stripper 28 through line 34. The high-temperature lean solvent in line 33 is advantageously employed as a heat exchange medium to heat the fat solvent stream in heat exchanger 27, and the effluent from heat exchanger 27 flows into the above-mentioned line 25 carrying lean solvent to the upper portion of absorber 23. It will usually be necessary for the lean solvent stream to be further cooled as by passing through heat exchanger 36 supplied with coolant such as cold water supplied via lines 37 and 38.

Although the absorber effluent gas passing through line 40 may be very low in carbon oxides, if the quantity of carbon oxides still present is too great for the hydrogen-consuming process to tolerate, the gas stream in line 40 may be passed into methanation reactor 41 which is maintained at conditions suitable for the reaction of carbon oxides and hydrogen to produce methane and water. The gas emerging from methanation reactor 41 through line 42 is substantially all hydrogen, containing small amounts of methane and water impurities and it may be passed as such to a hydrogen-consuming process shown schematically here as 43.

The combination of the methane reforming reaction and the carbon monoxide shift conversion reaction produces a gas stream in line 20 that contains approximately 18 percent carbon dioxide so that compressor 21 must compress the gas to about 1000 psi in order for the absorber to operate at a suitable carbon dioxide partial pressure. Since the gas in line 20 is at about 200 psi and it is a relatively dense gas, this compression may be effected in a centrifugal compressor having only a few stages. If reactor 13 produces hydrogen by partial oxidation of heavier hydrocarbons with oxygen, the product from which is similarly subjected to a carbon monoxide shift conversion reaction, the gas stream in line 20 will contain larger quantities of carbon dioxide, in the neighborhood of 30 percent, and in this case absorber 23 can function equivalently at a lower total pressure.

For the particular solvent described above, stripper 28 should operate with a reboiler temperature of about 240°F in order to remove the carbon dioxide from the solvent. The high pressure operation of absorber 23 not only increases solvent capacity, but it increases the ability of the solvent to accept carbon dioxide at high temperatures. As a result, the fat solvent stream 26 emerges from absorber 23 at temperatures in the neighborhood of 190°F, substantially higher than the temperature of the fat solvent stream from a low pressure absorption process, and since it is a more heavily loaded solvent than the fat solvent from a low pressure absorption process, it is much less voluminous. As a result of both of these factors, the heat load on stripper 28 is greatly diminished. A temperature difference of about 50° exists between the reboiler in the stripper and the effluent from the absorber, and the relatively low volume fat solvent stream may be heat exchanged with the high temperature lean solvent stream in heat exchanger 27 with far less surface area than the area required for a fat solvent stream of higher volume. As a result of the low-volume and high-temperature solvent flow, both capital investments in high surface heat exchangers and operating investments in energy are significantly reduced.

Figure 2:
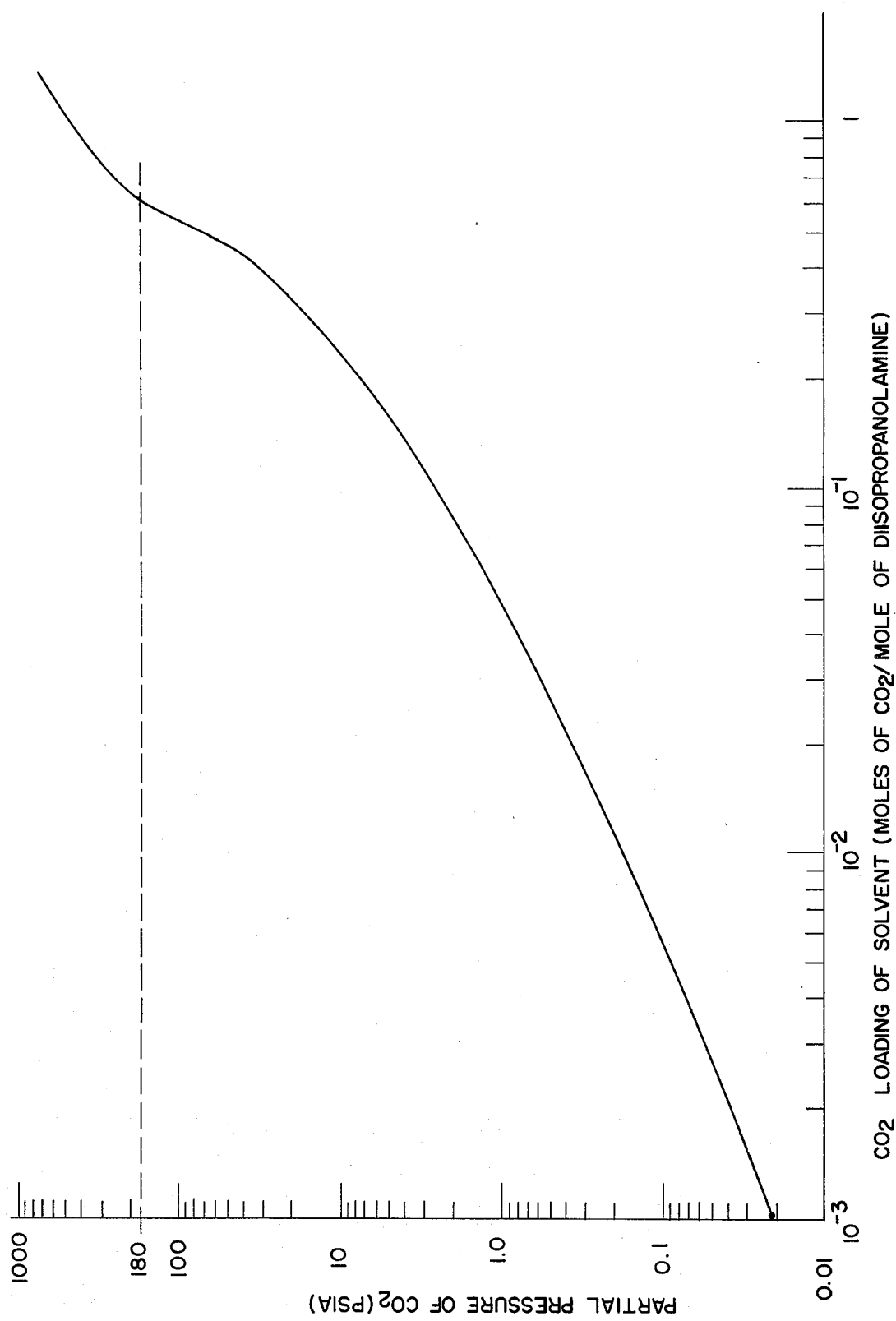

FIG. 2 illustrates graphically the benefit obtained from operating the absorber at an elevated pressure in accordance with this invention. FIG. 2 is a graphic representation of the solvent efficiency in terms of moles of carbon dioxide absorbed per mole of diisopropanolamine plotted against the partial pressure of carbon dioxide in the feed gas to the absorber. The plot is on a log scale for both the abscissa and the ordinate. As can be seen from examining FIG. 2, in lower pressure ranges the plot is fairly linear and each added increment of partial pressure produces a corresponding increment of solvent loading. However, as the solvent loading approaches 0.5 moles of $CO_2$ per mole of diisopropanolamine, the curve turns sharply upward because it is approaching the point where the chemical capacity of the solvent is exhausted. Although an added increment of $CO_2$ partial pressure produces a far less than corresponding increment of the solvent capacity at this point, it is observed that as the partial pressure of carbon dioxide in the feed increases to about 180 psi the curve again turns sharply so that each added increment of pressure produces more than a corresponding increment of solvent capacity, and the general trend of the curve indicates that increases in carbon dioxide partial pressure higher than 180 psi will result in more favorable solvent loading.

To exemplify the benefits obtained through the process of this invention, processes were designed to treat typical methane reforming gas that is subjected to the carbon monoxide shift conversion in accordance with this invention and in accordance with the prior art as set forth hereinabove. The plants were designed to treat 76 million standard cubic feet per day of hydrogen containing 18 percent by volume carbon dioxide to produce a gas stream containing 1000 parts per million of carbon dioxide.

The table below compares these designs showing process A which is the process of the present invention campared against process B which is the process of the prior art. All figures in the table relate only to the absorber-stripper portion of the design and do not reflect savings that are effected in the hydrogen production or consuming portions of the process.

| Operating Conditions | Process A | Process B |
|---|---|---|
| Lean Solvent Temperature, °F | 130 | 105 |
| Absorber Pressure, psig | 1050 | 220 |
| Solvent Flow, gal/min to Absorber | 2424 | 3020 |
| Heat Supplied to Fat Solvent Stream, BTU/lb of $CO_2$ Removed | 1345 | 2070 |
| Capital Cost (million dollars) | | |
| Process Unit | 3.15 | 4.01 |
| Utilities | 0.23 | 0.30 |
| Initial Solvent Fill | 0.13 | 0.21 |
| Total | 3.51 | 4.52 |

The high pressure operation of the absorber in process A not only results in a higher temperature fat solvent stream to the stripper, but it additionally permits a higher temperature lean solvent stream to be employed in the absorber. In a process such as the one described, the effluent from the carbon monoxide shift conversion zone must be cooled before being introduced into the absorber and it is normally heat exchanged in the reboiler of the solvent stripping column. Heat supplied to the stripper is also obtained by heat exchanging the fat solvent stream with the lean solvent stream. The sum of all heat input to the stripper is shown in process A to be 1345 BTU per pound of $CO_2$ removed from the gas, while for process B it is 2070. This substantially smaller heat input is reflected in capital savings in lesser heat exchange areas, and in operating savings in moving streams of lesser volume. Since process A requires a substantially reduced solvent flow rate, a smaller column can be employed which requires a lesser inventory of solvent in the system. Therefore, there is not only realized an energy saving in the circulation rate of solvent and the heat load in treating the solvent, but a rather substantial saving in the cost of initial solvent to fill the process equipment.

The portion of the table comparing the capital cost of process A and process B converts to dollars the processing advantages indicated under Operating Conditions. The smaller diameter columns, the smaller heat exchangers, the smaller pumps for solvent circulation, and other advantages set forth above, and particularly the use of a simle centrifugal compressor to replace a complicated reciprocating compressor reduce the capital investment in a plant for equivalent hydrogen production to three-quarters of the cost of such a plant built in accordance with the prior art. It is obvious that corresponding savings in operating costs would also be obtained. In addition to the savings mentioned above, the reliability and simplicity of a centrifugal compressor provides an estimated capital savings of about one million dollars. Most shut-downs in hydrogen producing plants feeding hydrogen-consuming processes are for repair and maintenance of reciprocating compressors. By designing a plant to use a centrifugal compressor, in accordance with this invention, the added increment of on-stream time is reflected in a smaller hydrogen-consuming plant to obtain the same annual capacity. The capital saving mentioned above is in the design of a hydrocracking plant which is a typical hydrogen-consuming plant, and this saving in the size of the hydrogen-consuming process is over and above all savings realized in the hydrogen-producing process per se.

What is claimed is:

1. A process for supplying hydrogen to a high pressure catalytic hydrogen-consuming process which comprises:
   A. partially oxidizing hydrocarbon to produce a carbon monoxide and hydrogen-containing gas,
   B. reacting the carbon monoxide and hydrogen-containing gas with water to produce a carbon dioxide and hydrogen-containing gas,
   C. centrifugally compressing said carbon dioxide and hydrogen-containing gas to a carbon dioxide partial pressure of at least 180 psi,
   D. contacting the resultant compressed gas with an absorbing liquid consisting essentially of diisopropanolamine, a cyclotetramethylene sulfone and water to produce an absorber effluent gas that is substantially free of carbon dioxide, said effluent gas being at a pressure which at least approximates that of the high pressure hydrogen-consuming process,
   E. introducing said absorber effluent gas into said hydrogen-consuming process.

2. The process of claim 1 wherein the absorber effluent gas is subjected to conditions to react any carbon monoxide and carbon dioxide present therein with hydrogen to produce methane whereby the resultant hydrogen gas substantially free of carbon monoxide and carbon dioxide is produced and introduced into said hydrogen-consuming process.

3. The process of claim 1 wherein hydrocarbon is oxidized by the steam-hydrocarbon reforming reaction, said reforming reaction being effected at a pressure not exceeding about 200 psi.

4. The process of claim 1 wherein partial oxidation of hydrocarbon is effected at a pressure not in excess of about 200 psi.

5. The process of claim 1 wherein said hydrogen-consuming process comprises hydrocracking of petroleum fractions.

\* \* \* \* \*